(12) United States Patent
Thore

(10) Patent No.: US 11,119,233 B2
(45) Date of Patent: Sep. 14, 2021

(54) METHOD FOR ESTIMATING ELASTIC PARAMETERS OF SUBSOIL

(71) Applicant: TOTAL SA, Courbevoie (FR)

(72) Inventor: Pierre Thore, Pau (FR)

(73) Assignee: TOTAL SA, Courbevoie (FR)

( * ) Notice: Subject to any disclaimer, the term of this patent is extended or adjusted under 35 U.S.C. 154(b) by 696 days.

(21) Appl. No.: 15/565,586

(22) PCT Filed: Apr. 10, 2015

(86) PCT No.: PCT/IB2015/000637
§ 371 (c)(1),
(2) Date: Oct. 10, 2017

(87) PCT Pub. No.: WO2016/162717
PCT Pub. Date: Oct. 13, 2016

(65) Prior Publication Data
US 2018/0106918 A1    Apr. 19, 2018

(51) Int. Cl.
*G01V 1/30* (2006.01)
*G01V 99/00* (2009.01)

(52) U.S. Cl.
CPC ............ *G01V 1/306* (2013.01); *G01V 99/005* (2013.01); *G01V 2210/6226* (2013.01); *G01V 2210/6242* (2013.01)

(58) Field of Classification Search
CPC .................. G01V 1/306; G01V 99/005; G01V 2210/6242; G01V 2210/6226
See application file for complete search history.

(56) References Cited

U.S. PATENT DOCUMENTS

| | | | | |
|---|---|---|---|---|
| 6,480,790 | B1* | 11/2002 | Calvert | G01V 1/282 702/14 |
| 2003/0070805 | A1* | 4/2003 | Bassin | C09K 8/72 166/250.02 |
| 2008/0319675 | A1* | 12/2008 | Sayers | G01V 1/50 702/11 |

(Continued)

OTHER PUBLICATIONS

Spindler et al., "Breaking the limit of seismic resolution: A sysnthetic example based on Tunu shallow gas development", Nov. 2013, pp. 1318-1326.*

(Continued)

*Primary Examiner* — John E Breene
*Assistant Examiner* — Eyob Hagos
(74) *Attorney, Agent, or Firm* — Patterson Thuente Pedersen, P.A.

(57) ABSTRACT

A subsoil region is represented using a grid having columns of cells arranged in an array of horizontal positions. The cells of a column are delineated by geological layering of the subsoil region. The method, used for estimating elastic parameters in the subsoil region, comprises obtaining seismic traces and performing seismic inversion for the columns of cells. The seismic inversion for a column comprises selecting a set of elastic parameter values that minimizes a cost function regardless of statistical distribution of the elastic parameter values. The set of elastic parameter values is selected among a plurality of candidate sets of elastic parameter values each having values of elastic parameters for the cells of the column.

12 Claims, 5 Drawing Sheets

(56) References Cited

U.S. PATENT DOCUMENTS

| | | | |
|---|---|---|---|
| 2010/0004870 A1* | 1/2010 | Tonellot | G01V 11/00 702/16 |
| 2010/0018718 A1* | 1/2010 | Krebs | G01V 1/28 166/369 |
| 2013/0028052 A1* | 1/2013 | Routh | G01V 1/28 367/43 |
| 2013/0176822 A1* | 7/2013 | Thore | G01V 1/306 367/73 |
| 2013/0223187 A1* | 8/2013 | Thapar | G01V 1/345 367/73 |
| 2015/0012256 A1* | 1/2015 | Routh | G01V 1/28 703/10 |

OTHER PUBLICATIONS

Hansen, "The CMA Evolution Strategy: A Comparing Review", 2006, pp. 75-102.*
Ma et al. "Simultaneous inversion of prestack seismic data for rock properties using simulated anneling", pp. 1877-1885 (Year: 2002).*
PCT International Search Report for PCT/IB2015/000637, dated Dec. 17, 2015, 3 pages.
Haas and Dubrule, "Geostatistical inversion—a sequential method of stochastic reservoir modelling constrained by seismic data", First Break vol. 12, N° 11, Nov. 1994, 9 pages.
Xin-Quan Ma: "Simultaneous inversion of presteck seismic data for rock properties using simulated annealing", Geophysics. vol. 67, No. 6, Nov. 1, 2002 (Nov. 1, 2002), pp. 1877-1885, XP055233727, US ISSN: 0016-8033, DOI: 10.1190/1.1527087.
Pierre Thore et al: "4D propagated layer-based inversion", Geophysics, vol. 88, No. 1, Dec. 5, 2014 (Dec. 5, 2014), pp. R-15-R29, XP055156716, ISSN: 0016-8033, DOI: 10.1190/geo2014-0088.1.
Nikolaus Hansen: "The CMA Evolution Strategy: A Comparing Review", Complexity Management in Fuzzy Systems: A Rule Base Compression Approach, vol. 192, Jan. 1, 2006 (Jan. 1, 2006), pp. 75-102, XP05523670, Berlin, Heidelberg, DE ISSN 1434-9922, DOI: 10.1007/3-540-32494-1_4 ISBN: 978-3-540-38885-2.
Bornard R et al: "Petrophysical seismic inversion to determine more accurate and precise reservoir properties", EAGE Conference and Exhibition, XX, XX, vol. SPE, No. 94144, Jun. 13, 2005 (Jun. 13, 2005), pp. 1-13, XP002364417.
Scales J A et al. "Global optimization methods for multimodal inverse problems", Journal of Computational Physics, London, GB, vol. 103, No. 2, Dec. 1, 1992 (Dec. 1, 1992), pp. 258-268, XP024752161, ISSN: 0021-9991, DOI: 10.1016/0021-9991(92)90400-S [retrieved on Dec. 1, 1992].

* cited by examiner

METHOD FOR ESTIMATING ELASTIC PARAMETERS OF SUBSOIL

RELATED APPLICATIONS

The present application is a National Phase entry of PCT Application No. PCT/IB2015/000637, filed Apr. 10, 2015, said application being hereby incorporated by reference herein in its entirety.

FIELD OF THE INVENTION

The invention pertains to the field of seismic inversion. It more specifically relates to methods for estimating elastic parameters of subsoil using seismic inversion.

BACKGROUND OF THE INVENTION

Geophysical surveys seek to acquire data that can be used to provide a realistic representation of a subsoil region, to locate hydrocarbon reservoirs and obtain information on the composition of geological layers in the subsoil region. Seismic waves generated at the surface are measured with detectors on the surface after being reflected by geological layers (interfaces between portions of the subsoil region having different elastic parameters).

Seismic inversion is a convenient tool to generate such a representation using seismic data. Seismic data generally comprise seismic traces representing the amplitude of seismic waves propagating through the subsoil region from sources to detectors. The representation of the subsoil region is generally obtained by determining elastic parameter values in the geological layers. For example, such elastic parameters may include the Poisson ratio and the acoustic impedance of geological layers.

Given the amount of seismic data that needs to be processed and the number of unknown parameters in the subsoil region, using seismic inversion is a tedious task.

Many sets of elastic parameter values need to be calculated based on the measured seismic traces. To simplify calculations, the subsoil region is generally represented as a grid meshed according to either an object-based grid or a pixel-based grid. Object-based grids, such as reservoir grids, have a layered structure. Each layer mimics the expected stratification of the subsoil region. Pixel-based grids, also called planar grids, are generally made of square units (pixels) that may not accurately reflect the shape of geological layers. Seismic inversion calculates values of elastic parameters within cells of the chosen grid. Each cell of an object-based grid or a pixel-based grid corresponds to a homogeneous medium associated with a determined value for each elastic parameter sought.

Seismic inversion proceeds iteratively by probing different candidate sets of elastic parameters values. A model $R(t)$ of the subsoil region, generated using chosen or calculated sets of elastic parameter values, is used to simulate a seismic trace which is then compared to a measured seismic trace $S(t)$. To simulate a seismic trace using a model $R(t)$, a model wavelet $w(t)$ corresponding to the wave generated at the source is convoluted with $R(t)$. Ideally, simulation matches measurement so that:

$$S(t)=w(t) \otimes R(t)$$

This ideal situation does not occur in practice at least because of the presence of noise in seismic data. Seismic inversion iteratively updates $R(t)$ to account for the difference between a simulated seismic trace $w(t) \otimes R(t)$ and a measured seismic trace $S(t)$. This iterative approach converges towards an acceptable model once the value of this difference reaches a minimum of the same order of magnitude as noise.

Seismic inversion generally uses an a priori model as a starting point and minimizes the difference $S(t)-w(t) \otimes R(t)$ using a conjugated gradient descent method or a kriging method. The difference $S(t)-w(t) \otimes R(t)$ is a term that is used to define a "cost function". Such seismic inversion therefore assumes that starting from an a priori model, the iterative minimization of the cost function leads to a best model $R(t)$.

Such an inversion algorithm may however not converge towards a solution that corresponds to the lowest minimum of a cost function. Indeed, complexity of the structure of the subsoil region, reflected in seismic data, gives rise to a cost function that generally has multiple local minima. Therefore, merely minimizing the cost function from any initial set of elastic parameter values may provide inaccurate results.

Instead of seeking a so-called best model $R(t)$ minimizing the cost function from any initial set of elastic parameter values, another type of inversion algorithm based on a stochastic approach may accept as reliable solutions models $R(t)$ that slightly differ from the so-called best model. One example of such an approach is described in article "Geostatistical inversion—a sequential method of stochastic reservoir modelling constrained by seismic data", *Haas and Dubrule*, FIRST BREAK Vol. 12, No 11, Nov. 1994. However such an algorithm may also not provide a model $R(t)$ that necessarily converges towards a global minimum of a cost function.

Prior art techniques such as that of Haas and Dubrule generally requires making strict assumptions about the statistical distribution of the elastic parameter values in the subsoil region. Such assumptions are required to both select a candidate set of elastic parameter values as a starting point of the iterative calculation, and to ensure a certain lateral continuity of the values of elastic parameters in the grid. One such assumption is that the statistical distribution of elastic parameter values in the subsoil region is Gaussian. However, such an assumption generally does not reflect the real distribution of elastic parameter values. Indeed, it has been observed that materials with low impedances such as clay and those with high impedances such as sand are much more likely to appear in a subsoil region than other materials. This gives rise to a more complex statistical distribution of the elastic parameter values that the Hass et Dubrule method cannot reproduce.

As a result, the prior art methods lack accuracy and may lead to the production of models $R(t)$ that are not best candidates to minimize the cost function. Furthermore, the approach of Haas and Dubrule cannot reuse previously calculated sets of elastic parameter values when a new round of simulations is performed, which in the long run, proves to be time consuming.

For the above reasons, a method for inverting seismic data to obtain a complete representation of a subsoil region, that avoids introducing biases leading to the determination of a local minimum of a cost function is sought.

SUMMARY OF THE INVENTION

To overcome the above-mentioned drawbacks, the invention provides a method for estimating elastic parameters in a subsoil region, wherein the subsoil region is represented using a grid having columns of cells arranged in an array of horizontal positions, wherein the cells of a column are delineated by geological layering of the subsoil region, the method comprising:

obtaining seismic traces associated with said horizontal positions;

performing seismic inversion for each of a plurality of said columns of cells, wherein the seismic inversion for a column of cells at a horizontal position of the array comprises selecting a set of elastic parameter values that minimizes a cost function regardless of statistical distribution of the elastic parameter values, wherein the set of elastic parameter values is selected among a plurality of candidate sets of elastic parameter values each having values of elastic parameters for the cells of the column, wherein the cost function has a component given by a difference between the seismic trace associated with said horizontal position of the array and a synthetic trace resulting from a candidate set of elastic parameter values.

In other words, the invention does not implement the algorithm minimizing the cost function based on any a priori assumption regarding a statistical distribution of elastic parameter values. Instead, the selection of the set of elastic parameter values at a given column is constraint-free. Unlike prior art methods, the method of the invention does not require that the sets of elastic parameter values on all the columns obey a given statistical distribution, such as for example, a Gaussian distribution.

Prior art methods for calculating sets of elastic parameter values are generally biased by an inappropriate initial selection of a candidate set of elastic parameter values. Furthermore, prior art, unlike the invention, selects candidate sets that obey a predetermined statistical distribution. Therefore, prior art methods cannot correctly account for more complex stratifications of a subsoil region in which the statistical distribution of elastic parameters is unknown and differs from a Gaussian distribution.

The invention can probe sets of elastic parameter values that may at first seem incompatible with generally accepted assumptions about the distribution of elastic parameter values in the subsoil region. The method of the invention does not assume a lateral continuity of the elastic parameter values. It does not assume that the distribution of elastic parameters has a Gaussian profile either. Instead of using a conjugated gradient descent method that may converge towards a local minimum of a cost function, the method of the invention can determine a most suitable set of elastic parameter values for cells of a column so as to reach the global minimum of the cost function. This allows overcoming any bias introduced for example during the selection of an initial set of elastic parameters to start an iterative inversion algorithm.

Advantageously, the seismic inversion may be carried out by running a global minimization algorithm.

A global minimization algorithm makes the most of the advantages provided in the invention by the absence of any assumption on the statistical distribution of the elastic parameter values. A global minimization algorithm, unlike gradient descent methods, does not limit the candidate sets of elastic parameters to a few candidates that comply with imposed criteria of statistical distribution or lateral continuity. Instead, it accepts candidate sets that may differ significantly from sets calculated at neighboring columns.

In particular, the global minimization algorithm may comprise a covariance matrix adaptation-evolution strategy (CMA-ES) algorithm.

A CMA-ES algorithm is a useful tool to probe a large set of elastic parameters and determine which one increases the likelihood of converging towards a lower and ideally a lowest minimum of the cost function. Using such an algorithm, the risk of missing the lowest minimum of the cost function is reduced. CMA-ES converges faster towards an optimized set of elastic parameters than a random search.

The method may further comprise:
selecting an uncertainty value for a group of candidate sets of elastic parameter values, wherein the group comprises a number of candidate sets of elastic parameters equal to, or greater than, $4+E[3*\ln(n)]$, E being a floor function, ln the natural logarithm function and n a total number elastic parameters in a column.

The above formula provides a means of determining a particularly convenient number of candidate sets used at an iteration of a CMA-ES algorithm.

According to an embodiment, the method further comprises selecting an uncertainty value for a group of candidate sets of elastic parameter values. The group typically comprises between ten and fifty candidate sets of elastic parameters.

A CMA-ES algorithm generally adapts the uncertainty value used to select a number of points for which a set of parameters is tested. In the method of the invention, the uncertainty value may typically be selected as large at a first iteration. This provides a global insight into the distribution of values of the cost function by selecting sets of elastic parameters that differ much from one another. If sets of elastic parameters all appear to result in higher values for the cost function, the initial set of elastic parameters is kept, and the CMA-ES process is repeated with a smaller uncertainty value. It can also be increased in certain cases. A group made up of between ten and fifty candidate sets of elastic parameters is small enough to allow a rapid calculation of the values of the cost function for each candidate set and big enough to provide a picture of the values and shape of the cost function.

According to an embodiment, the method may further comprise selecting each column of cells randomly, and selecting the set of elastic parameter values by taking into account any available set of elastic parameter values for other cells of the grid.

By selecting the second position at random, the method may map a larger portion of the subsoil region faster than other methods for example such methods that provide elastic parameter values of the subsoil region along a path made of adjacent columns only.

In another embodiment, the method comprises:
selecting an initial position of the array;
determining a boundary consisting of horizontal positions of the array which are adjacent to the initial position;
implementing the global minimization algorithm for at least one position of the boundary;
calculating a value of the cost function for each of said at least one position of the boundary;
selecting a propagation position in the boundary, the value of the cost function at said propagation position having a smallest value, then removing the selected propagation position from the boundary;
updating the boundary by adding positions of the array which are adjacent to the propagation position.

Such a propagative algorithm to obtain an estimation of elastic parameters in the subsoil region provides a picture of the subsoil region along a path that has few discontinuities. Indeed, starting from a column or set of columns for which a suitable set of elastic parameter values is available, the invention selects the neighboring column for which the computed value of the cost function has the lowest value. A lower value of the cost function is an indication that the subsoil region at that column is not prone to unexpected variations, for example variations caused by the presence of a fault line. This propagative algorithm therefore estimates elastic parameters along a path that avoids fault lines or other similar inhomogeneities that increase the likelihood of obtaining inaccurate representations of the subsoil region.

Advantageously, the elastic parameters comprise acoustic impedances and Poisson ratios.

The method of the invention may as well be applied to compute other elastic parameters, such as, for example, compression/shear wave propagation speed, or soil density. Acoustic impedance and Poisson ratios are parameters allowing an easy identification of the composition of a geological layer.

Advantageously, the geological layering of the subsoil region may comprise both permeable and non-permeable layers Advantageously, the geological layering of the subsoil region may define more than one hundred layers in the subsoil region.

The number of layers involved in the method of the invention is greater than in most known methods. When implemented, the method of the invention seeks to build a reliable model on the whole of the subsoil region. Because of the high number of layers involved, the delineated cells have fixed boundaries.

According to an embodiment, each layer in the subsoil region corresponds to soil thickness between 0,5 meters and 2 meters.

Well logs provide a reliable insight into the structure of the subsoil region. When geophysicists manually pick the positions of the geological layers, they rely on any source of information that is available, most of which may come from well logs. When picking layers, geophysicists may also rely on a seismic image to located fault lines or likely positions for interfaces. These fixed positions are picked to form the geological layers that delineate the cells.

The invention also pertains to a computer program product to carry out a method for estimating elastic parameters in a subsoil region when run in a processor unit. The subsoil region is represented using a grid having columns of cells arranged in an array of horizontal positions, wherein the cells of a column are delineated by geological layering of the subsoil region. The computer program product comprises instructions to cause execution of the following steps when run in the processor unit:
  obtaining seismic traces associated with said horizontal positions;
  performing seismic inversion for each of a plurality of said columns of cells,
  wherein the seismic inversion for a column of cells at a horizontal position of the array comprises selecting a set of elastic parameter values that minimizes a cost function regardless of statistical distribution of the elastic parameter values, wherein the set of elastic parameter values is selected among a plurality of candidate sets of elastic parameter values each having values of elastic parameters for the cells of the column, wherein the cost function has a component given by a difference between the seismic trace associated with said horizontal position of the array and a synthetic trace resulting from a candidate set of elastic parameter values.

BRIEF DESCRIPTION OF THE DRAWINGS

The method of the invention will be better understood by reading the detailed description of exemplary embodiments presented below. These embodiments are illustrative and by no means limitative. They are provided with the appended drawings in which.

For the sake of clarity, the dimensions of features represented on these FIGS. may not necessarily correspond to the real-size proportions of the corresponding elements. Like reference numerals on the FIGS. correspond to similar elements or items.

DETAILED DESCRIPTION OF THE INVENTION

Figure 1:
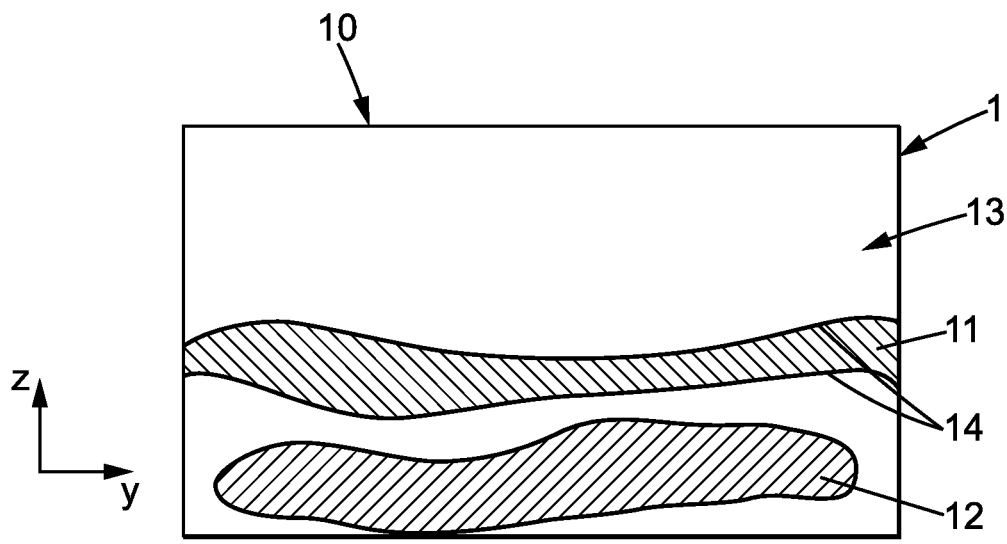
FIG. 1 is a schematic representation of a subsoil region putting emphasis on permeable layers.

To obtain information on the structure of a subsoil region 1, the invention relies on seismic data obtained from that subsoil region. Seismic data is obtained in the form of seismic traces corresponding to the amplitude of seismic waves detected at the surface 10 above the subsoil region. FIG. 1 provides a two-dimensional illustration of a subsoil region 1 below a surface 10. Generally, the subsoil region 1 is comprised of a small number of geological layers 11, 12 that are permeable. Generally, permeable layers are those that contain hydrocarbons that can be extracted from the subsoil region 1.

The method of the invention seeks to obtain information on the composition of all the geological layers of subsoil, including the composition in non-permeable layers of portion 13 of FIG. 1.

Figure 2:
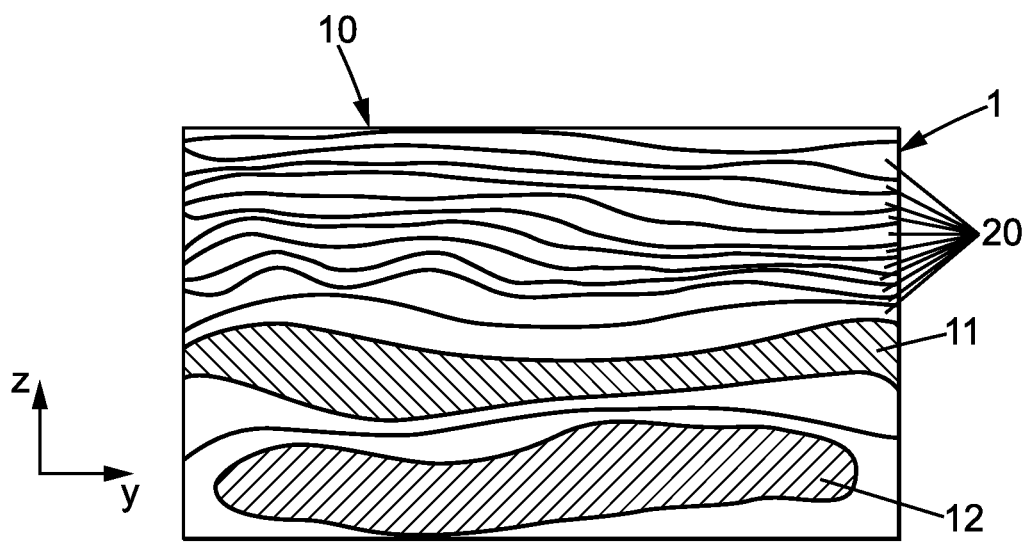
FIG. 2 is a schematic representation of the subsoil region of FIG. 1 showing all geological layers, including non-permeable layers.

As illustrated on FIG. 2, subsoil region 1 comprises a far greater number of geological layers than what is seen on FIG. 1. When permeable layers may account for about ten geological layers in the subsoil, subsoil region 1 may altogether be comprised of hundreds of geological layers 20, 11, 12.

The method of the invention uses seismic inversion to obtain values of elastic parameters in all geological layers of subsoil region 1. As illustrated on FIG. 3, subsoil region 1 is a three-dimensional volume below surface 10. Generally, seismic data recorded at different positions at surface 10 provide a global insight into the shape and position of geological layers in subsoil region 1. Geophysicists have tools to draw a gross picture of the shape and positions of interfaces, geological layers, fault lines in the subsoil region 1 using seismic images. Seismic images identify the position of geological layers via seismic horizons.

The position of geological layers can be further determined by comparing the position of seismic horizons to information extracted from well logs, drills performed in the subsoil region 1. Any source of information providing an insight into the actual structure of subsoil region 1 can be taken into consideration when determining the position and shape of geological layers 20, 11, 12.

Figure 3:
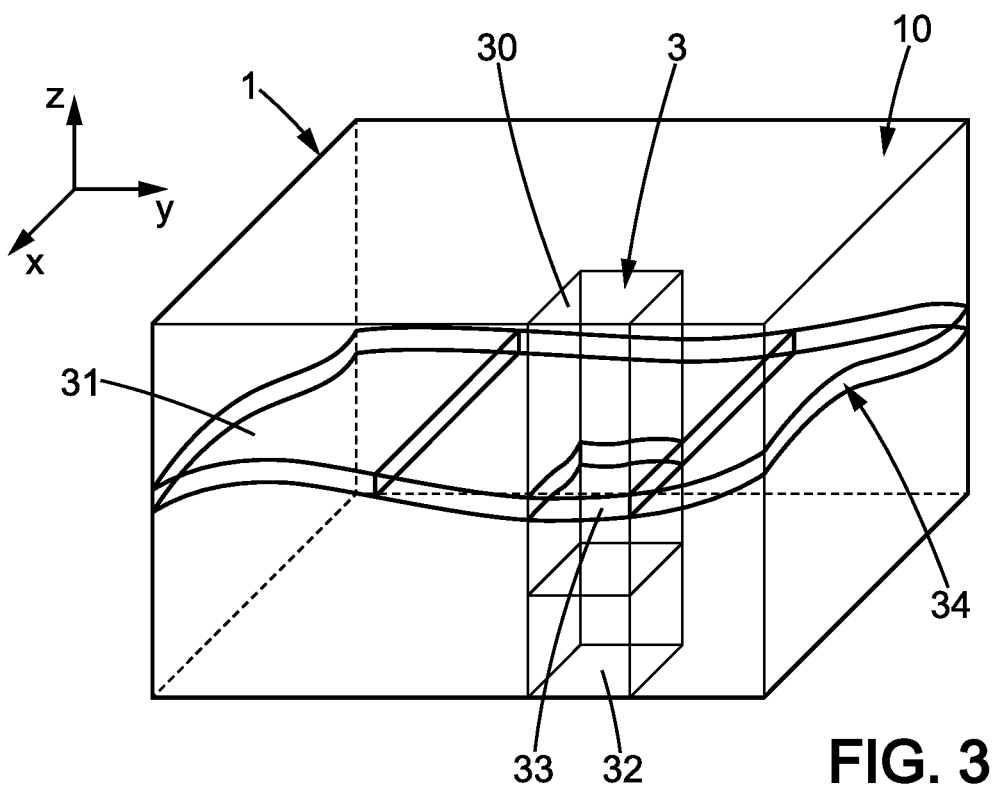
FIG. 3 is a schematic representation of the subsoil region of FIGS. 1 and 2 in three dimensions showing a cell of a reservoir grid, a cell of a planar grid and a cell of a grid used in a method of the invention.

Prior to estimating elastic parameter values, the method of the invention generates a grid having columns 3 of cells 33 an example of which is illustrated on FIG. 3.

Layer 34 on FIG. 3 illustrates one geological layer of subsoil region 1 that is part of a reservoir grid. Cells of the reservoir grid are large in a horizontal plane along axes x and y of FIG. 3, but are typically thin along a vertical axis z. A geological layer can typically have a thickness of one meter, or between half a meter and five meters. Cell 31 illustrates these relative proportions along axes x, y and z.

Instead of a reservoir grid, planar grids could be used to represent subsoil region 1. However, these do not respect the stratification of subsoil region 1. Cell 32 illustrates one example of a cell from a planar grid. It is pixel-shaped, and although it has a relatively small size along axes x and y, it has a rather large size along axis z compared to cell 31. Therefore, using a planar grid may lead to poor vertical resolution.

The method of the invention involves seismic inversion in cells 33 of FIG. 3. These cells are neither planar nor pixel-based, but rather form a hybrid grid benefitting both from a good vertical resolution along axis z and a good resolution along axes x and y. Cell 33 is delineated by geological layers along axis z and by the boundaries of a column 3 along axes x and y. Column 3 results from an extrusion of the area defined by horizontal position 30 along axis z.

A grid may typically altogether comprise about ten million columns.

Figure 4:
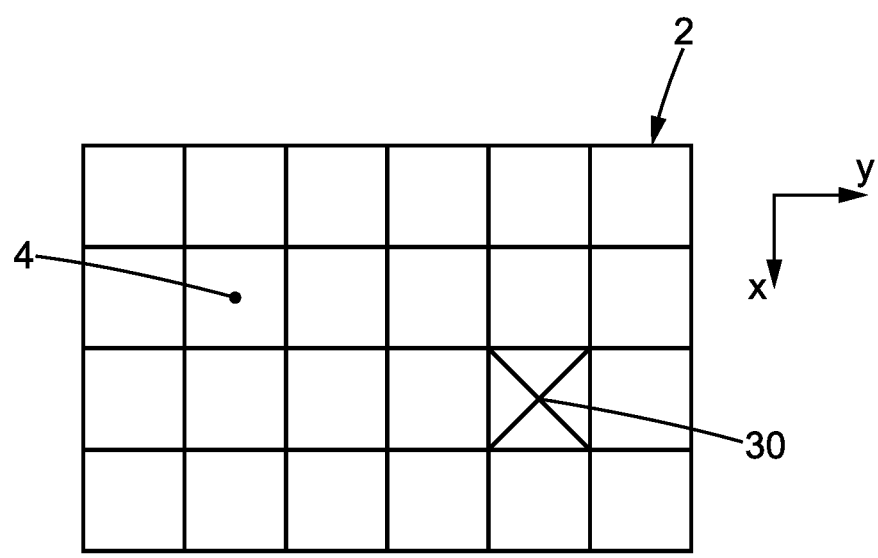
FIG. 4 is a schematic representation of the surface above the subsoil region of FIGS. 1, 2 and 3, showing an array of horizontal positions.

Surface 10 is meshed according to an array 2 of horizontal positions to ease identification of each column. One example of such an array 2 is represented on FIG. 4 illustrating surface 10 viewed from above. Column 3 is identified by position 30 on that FIG. Position 4 indicates the position for which the stratification of the subsoil region is known from a well log.

General information available on the structure of the subsoil region from well logs may enable the construction of a gross low-frequency model of the subsoil region 1. Such low-frequency information is useful to account for gross variations in values of elastic parameters. Indeed, seismic data does not accurately account for such gross variations because it is generally bandlimited between 10 Hz and 80 Hz.

This low-frequency data may be input as background information relating to the continuity of the values of elastic parameters in the subsoil region 1. More specifically, knowledge of this low-frequency information may be used to smoothen the values of elastic parameters in cells 33 to compensate for the lack of seismic information at low frequencies.

The method of the invention seeks values of elastic parameters for each cell of each column that minimize a cost function. The cost function is calculated by referring to a difference between a simulated seismic trace and a measured seismic trace. There are different ways of defining a cost function. It may for example be possible to provide other components in addition to the difference between the simulated and measured seismic traces. Such additional penalty component(s) may include the distance to an initial model, a sparseness term, a vertical correlation term, in order to stabilize the inversion. The purpose of a cost function is to provide information on how much a seismic term, relating to a measured seismic trace, differs from a simulated seismic trace.

Seismic inversion algorithms generally process seismic data in order to minimize a cost function starting from an a priori initial estimation relating to the elastic parameter values of cells of a column. Several assumptions on the expected distribution of elastic parameters in the subsoil region are likely to bias the initial estimation in such a way that the estimation becomes a bad starting point to implement the iterative algorithm seeking the minimum of a cost function.

Figure 5:
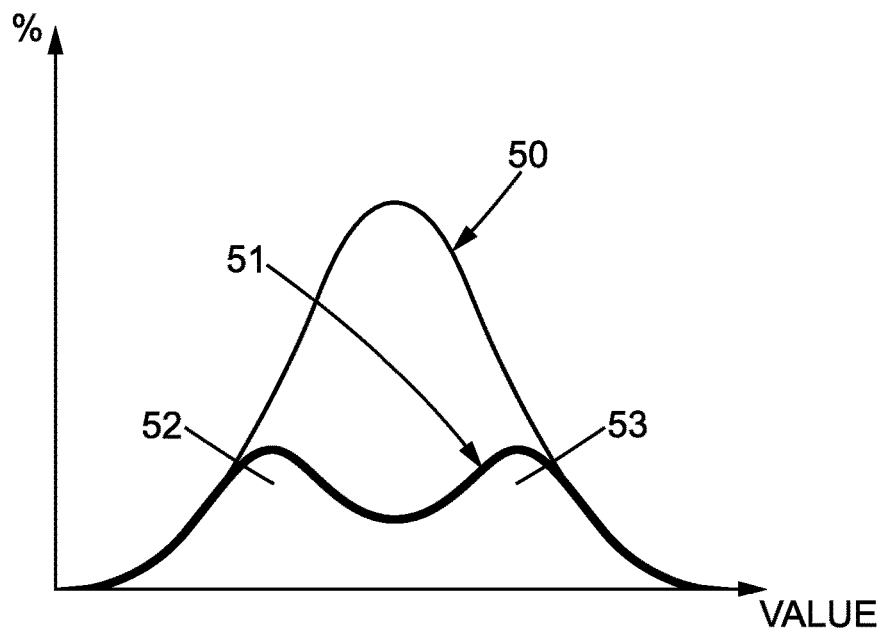
FIG. 5 is a graph to compare statistical distributions of elastic parameter values.

FIG. 5 illustrates one false assumption that is generally made on the distribution of elastic parameters in the subsoil region 1 and which affects the values of elastic parameters obtained through seismic inversion. FIG. 5 represents a histogram of the values of elastic parameters, for example rock density. Line 50 is a Gaussian distribution of rock density. Most methods using seismic inversion assume such a distribution in the subsoil region 1, and select candidate sets of elastic parameters so as to obtain an overall Gaussian distribution of elastic parameters. Such an assumption facilitates the selection of initial sets of elastic parameters, and can easily account for a lateral continuity of the values of elastic parameters in the subsoil region 1.

Line 51 corresponds to a more realistic histogram of rock density, in which low density 52 rocks such as clay and high density 53 rocks such as sand are more likely to appear than intermediate density rocks.

False assumptions may lead to the selection of sets of elastic parameters values that carry an inversion algorithm away from a global minimum of the cost function. The introduction of such a false assumption biases the set of elastic parameter values with no possibility of correcting the bias during the iterative process in a gradient descent method.

Other false assumptions on the profile of the spatial distribution of elastic parameter values also tend to carry inversion algorithms away from finding the global minimum of a cost function. In particular, assuming a form of lateral continuity in the model does not accurately account for specific features of the subsoil region 1 such as fault lines.

Figure 6:
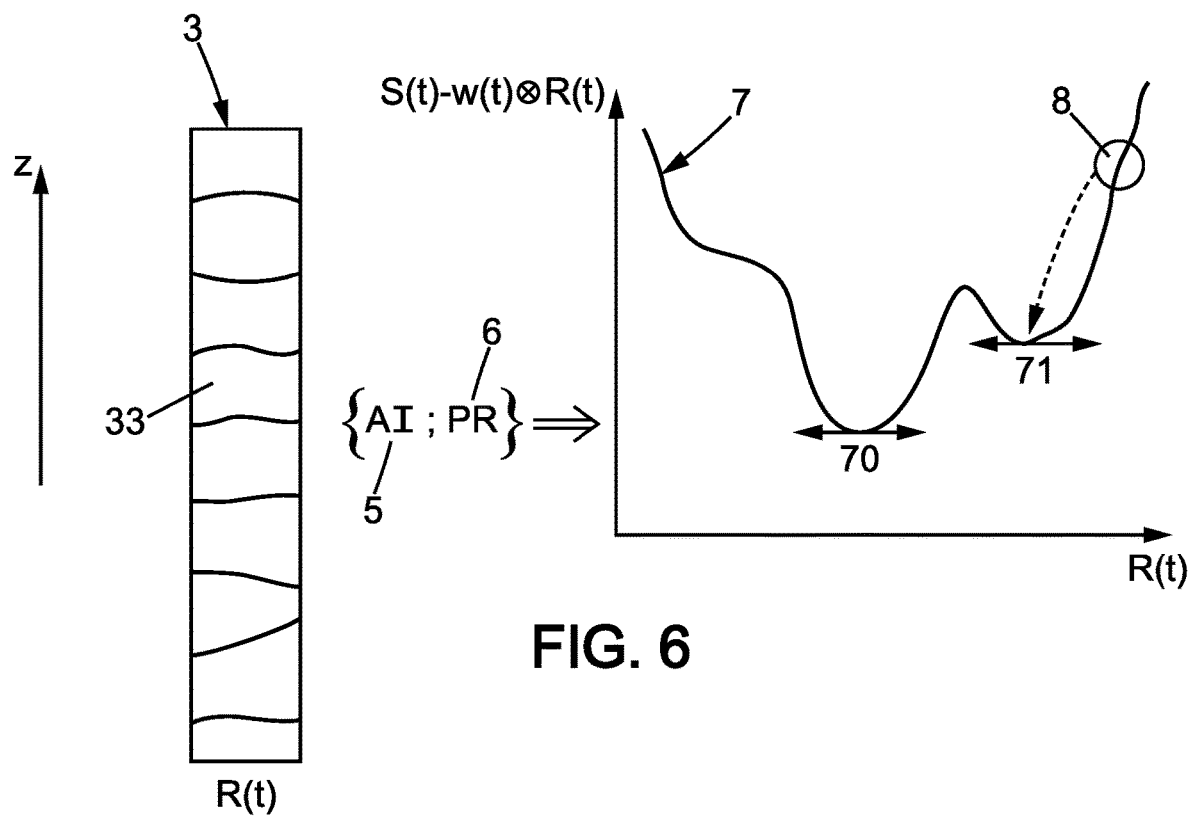
FIG. 6 is a schematic representation of a column at a position in the array of horizontal positions of FIG. 4, along with a value of the cost function calculated using a candidate set of elastic parameter values for cells of that column.

FIG. 6 provides one representation of a cost function 7 with two minima: a global minimum 70 of the cost function and a local minimum 71 of the cost function 7.

FIG. 6 also represents column 3 with cells 33. Two values of elastic parameters are associated with each cell 33: a value of acoustic impedance 5 and a value of a Poisson ratio 6.

The method of the invention may initially start by selecting a candidate set of elastic parameter values based on some assumption regarding the subsoil region 1. As represented on FIG. 6, the estimation may lead to a first value 8 of the cost function 7 that is closest to local minimum 71. The first value 8 may for example be calculated as being proportional to the difference between a simulated seismic trace w(t)⊗R(t) and a measured seismic trace S(t):

$$\frac{(S(t) - w(t) \otimes R(t))^2}{S(t)^2}$$

The simulated seismic trace is obtained by a convolution between model wavelet w(t) and a model of reflectors R(t) built using the candidate set of elastic parameter values.

Unlike prior art methods, algorithms used in the invention are capable of correcting an initial bias to find better candidate sets of elastic parameter values.

Figure 7:
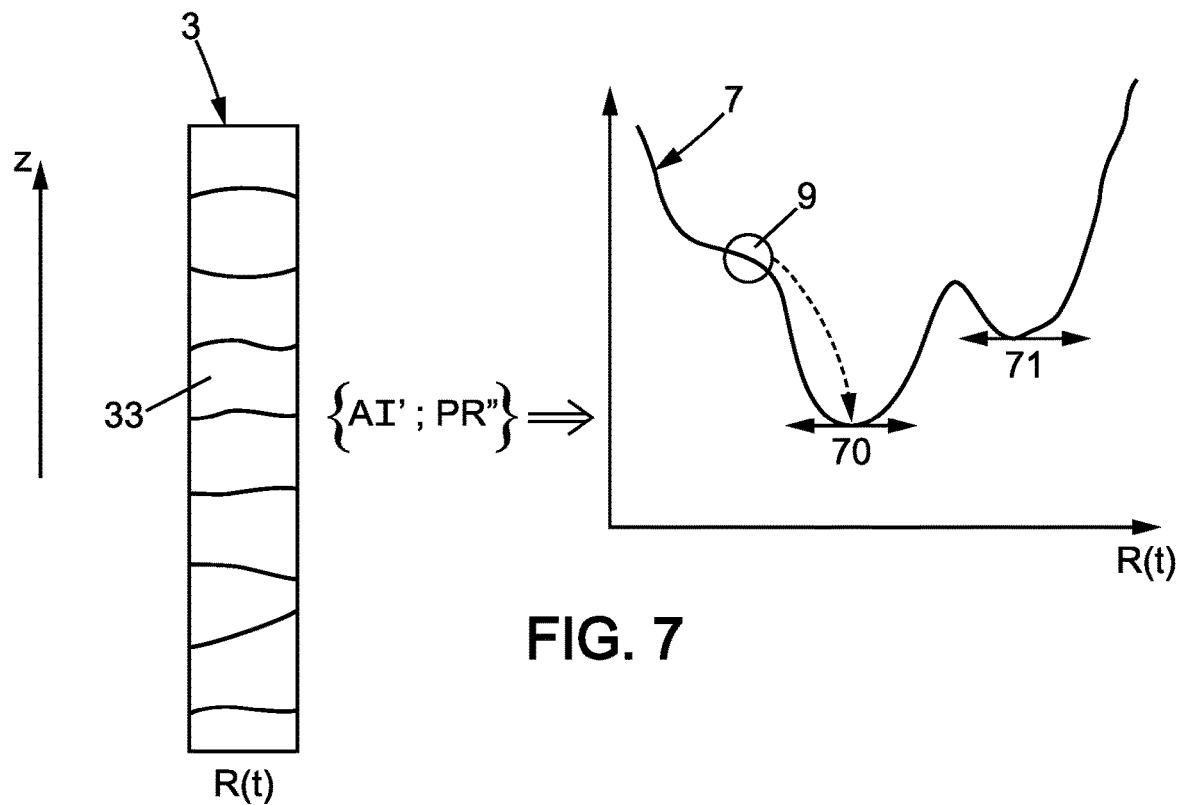
FIG. 7 is a schematic representation of a column at a position in the array of horizontal positions of FIG. 4, along with a value of the cost function calculated using another candidate set of elastic parameter values for cells of that column.

As seen on FIG. 7, the selection of another candidate set of elastic parameter values in cells 33 of column 3 leads to a calculated second value 9 of the cost function 7 that is closer to the global minimum of the cost function 7.

Based on the first value 8 and the second value 9 of the cost function 7, the method of the invention may select another candidate set that takes into consideration both values 8 and 9 of the cost function 7, using optimization algorithms. It may also select the candidate set leading to the lowest value of the cost function, which in the example of FIGS. 6 and 7 corresponds to the candidate set leading to the second value 9.

This process may be implemented iteratively so as to find the lowest minimum of the cost function 7.

Once the process of selecting candidate sets of elastic parameter values reaches a point at which the cost function is not minimized, the process is stopped. Alternatively, the process may be continued by implementing a gradient descent method algorithm in an attempt to further minimize the cost function 7.

When minimizing the cost function 7, it is generally assumed that a minimum has been reached when the value of the cost function is of the order of magnitude of the noise present in seismic data. One criterion for stopping an algorithm seeking to minimize the cost function 7 may be a comparison of the value of the cost function 7 with that noise. Another criterion may be set by a threshold number of iterations, above which the algorithm is stopped. For example, between 4000 and 10 000 iterations may be implemented for each column 3.

The above method can be implemented on each column 3 so as to obtain a complete map of the values of elastic parameters in the geological layers of subsoil region 1.

The general method described above may be implemented in different ways.

One particularly advantageous embodiment to overcome any bias introduced when selecting a candidate set of elastic parameters consists in using a Covariance Matrix Adaptation-Evolution Strategy, or CMA-ES algorithm.

Figure 8:
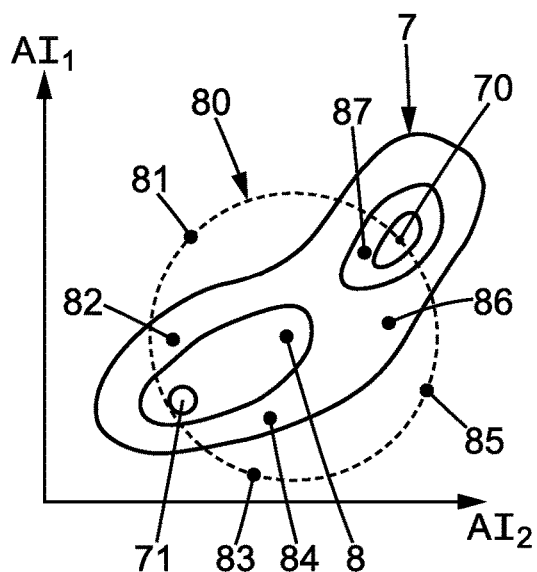
FIG. 8 is a schematic representation of a cost function in a two-dimensional space illustrating the implementation of a step of a CMA-ES algorithm.
Figure 9:
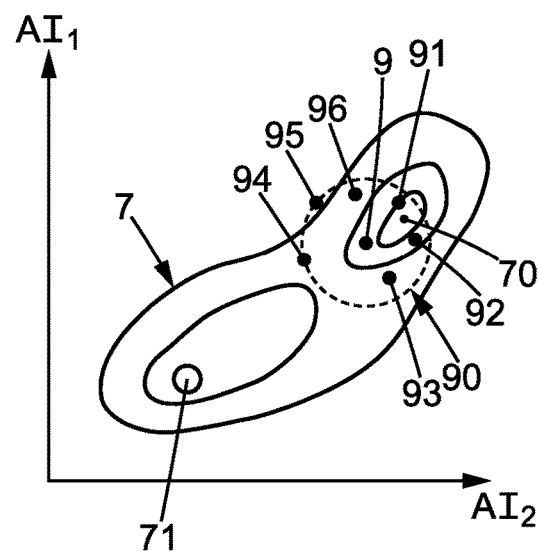
FIG. 9 is a schematic representation of a cost function in a two-dimensional space illustrating the implementation of a step of a CMA-ES algorithm seeking to reach the global minimum of the cost function.

One illustrative example of a CMA-ES-type algorithm used in combination with the method of the invention is represented on FIGS. 8 and 9.

FIG. 8 represents a two-dimensional view of the cost function 7 as a function of the value of two acoustic impedances $AI_1$ and $AI_2$ in two different geological layers of a column. Two minima of the cost function are represented: global minimum 70 and local minimum 71.

In addition to the general steps presented above, CMA-ES probes several candidate sets of elastic parameter values for cells of a column. As represented on FIG. 8, starting from an initial candidate set of elastic parameter values leading to the first value 8 of the cost function, the CMA-ES algorithm tests a group of six other candidate sets leading to several values 81-87 of the cost function. These candidate sets are not chosen randomly. In fact, an uncertainty value, also called variability, is selected in advance, and the candidate sets are chosen so that the distribution of their elastic parameter values is consistent with the prior uncertainty. Circle 80 on FIG. 8 represents an approximation of the area within which the values 81-87 may be located when a large variability is selected.

Initially, the variability may be defined as being large, so that the elastic parameter values of the candidate sets differ greatly from one another. By probing candidate sets that differ greatly from one another, the likelihood of finding a sweet spot in the cost function, closest to the global minimum of the cost function 7, increases.

The CMA-ES algorithm may select a set of elastic parameter values from the group of candidate sets or maintain the initial candidate set. This selection is based on the calculated values of the cost function 7, which provide an insight into the shape of the cost function. In the example of FIG. 8, candidate set leading to value 87 of the cost function is selected, because value 87 is the smallest value calculated for candidate sets of the tested group.

However, the algorithm may select another candidate set of elastic parameter values based on a calculated guess of where a lower value of the cost function may be expected, by taking into account the general trend in the evolution of the cost function within circle 80.

FIG. 8 illustrates one iteration of the CMA-ES algorithm. FIG. 9 illustrates the CMA-ES algorithm at a later iteration. At this later iteration, the defined variability is reduced as indicated by the smaller radius of circle 90. Starting from a candidate set of elastic parameter values leading to a first value 9 of the cost function 7, a group of six candidate sets of elastic parameter values leading to values 91-96 of the cost function is selected in the same way as described above in connection with FIG. 8.

Typically, CMA-ES may repeat such iterations about two hundred times until a set of elastic parameter values is deemed to be suitable. After each iteration, the variability may be updated by taking into consideration the difference between the value of the cost function at the end of the iteration and the value of the cost function at the beginning of the iteration. In the example of FIG. 8, this difference would be represented by the value 9 subtracted from value 87. The variability may in particular increase if this difference is large, or decrease if it approaches zero.

The number of candidate sets selected at each iteration of the CMA-ES algorithm can typically vary between ten and about fifty. Groups of more than fifty candidate sets may slow the process and require more computation power. A particularly convenient number of candidate sets has been identified as corresponding to a number equal to 4+E[3*ln(n)], where ln is the natural logarithm function, E is the floor function, i.e. E[x] is the largest integer not greater than the real number x, and n represents the total number of elastic parameters in a column. The number of candidate sets may also be greater than 4+E[3*ln(n)].

The method described above may be implemented in different ways on the grid of subsoil region 1.

In particular, the method may use a sequential Gaussian simulation ("SGS") in which each column is selected randomly. Once the elastic parameters for cells of one column have been determined, they may be taken into consideration when selecting a candidate set of elastic parameter values for cells of another column. Initializing such an estimation may for example account for the distance separating two columns. Any assumption on the lateral continuity of the elastic parameters or the distribution of the values of elastic parameters may be made. Indeed, the CMA-ES algorithm described above is not irreversibly affected by such considerations and manages to find a global minimum of the cost function even if the initial candidate set of elastic parameter values is based on a false assumption on the statistical distribution of elastic parameter values.

Unlike prior art methods such as that described in the above mentioned article by Haas et Dubrule, once a set of elastic parameter values is determined for cells of one column, these parameters do not need to be computed again if the method is rerun using a different sequence of columns.

As an alternative to SGS, the method may use a propagative approach.

Instead of a random walk along positions of the array 2, the method may obtain values for elastic parameters of cells of a column by using an appropriate propagation method among the positions of the array 2, as discussed below.

Figure 10:
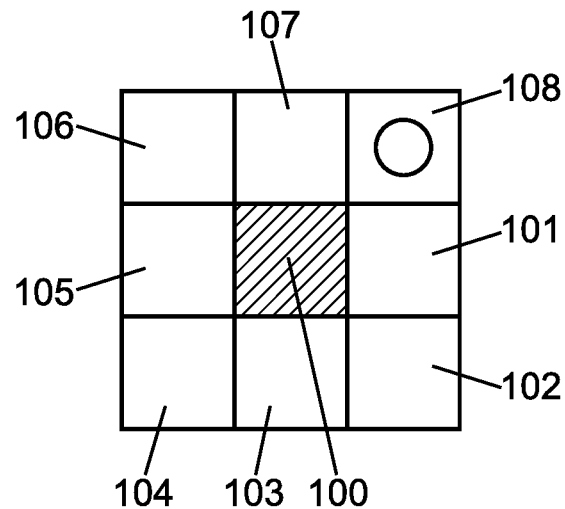
FIGS. 10 and 11 are schematic representations of a method for computing a model of the subsoil of FIG. 1 along a continuous path on the array of horizontal positions of FIG. 4.

FIG. 10 illustrates 9 adjacent positions on the array 2 of FIG. 4. Values of elastic parameters for each cell of the column associated to initial position 100 have been obtained. Positions 101-108 form a boundary around initial position 100. The propagative method applies the method described above to each of the eight adjacent columns associated with positions 101-108. As an alternative, the method may be implemented on a portion of these eight columns, for example at least two of these columns. The candidate set of elastic parameter values for cells of each of the eight adjacent columns is initially selected as being the same as elastic parameter values obtained at initial position 100. There is in theory no reason to assume that the elastic parameters would abruptly change in the immediate vicinity of a given position. Therefore, the values of elastic parameters obtained at initial position 100 appear to be the most relevant candidate set of elastic parameter values for adjacent columns.

Once the CMA-ES algorithm is implemented on at least two of the eight adjacent columns, these columns are provided with a set of elastic parameter values. A value of the cost function can be calculated for each of these eight columns. The propagative method selects the column for which the value of the cost function is the lowest. In the example of FIG. 9, this corresponds to the column associated with position 108.

Figure 11:
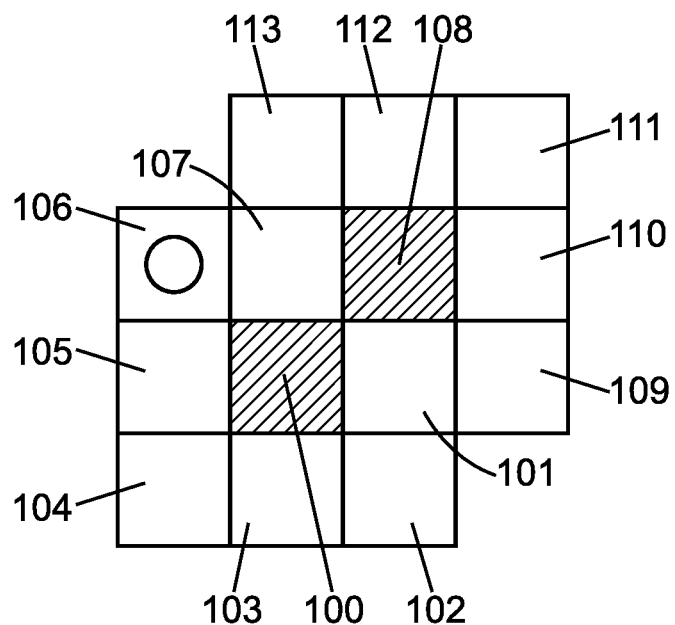

This position 108 is then removed from the boundary and the boundary is further updated by including all the positions 109-112 in the immediate vicinity of position 108, as illustrated on FIG. 11.

At this second iteration of the propagative method, candidate sets of elastic parameter values for cells of columns associated with positions 109-112 are obtained. There is, however, no need to determine elastic parameter values for columns associated with positions 101-107. For the columns of positions 101-107, elastic parameter values were determined at the previous iteration.

This propagative method may be continued either until a complete path across the grid is obtained or when elastic parameters have been obtained for all the columns of the grid.

The propagative method is advantageous in that, in order to reach a given position in the horizontal array, it follows a continuous propagation path within the subsoil region 1 from the initial position 100. The propagation does not take place through severe inhomogeneities such as fault lines, which typically give rise to high values of the cost function. A higher value of the cost function reflects a difficulty in matching the model R(t) with the available seismic data at a given position of the array 2. The propagative method described above gets around such discontinuities, which an SGS-type method cannot do.

The above method of estimating elastic parameters in the subsoil region 1 can be carried out using one or more computers. Each computer may include one or more processor units, memory for storing data, a permanent storage system such as one or more hard drives, communication ports for managing communications with external devices, particularly in order to retrieve the hybrid grid, the seismic data and, if need the well log data, and in order to output information representing the estimated parameters, either as figures, as graphic data or both, and user interfaces such as a screen, keyboard, mouse, etc.

Typically, the calculations and steps described above are executed by the processor unit or units using software modules that may be stored in the form of program instructions or code readable by the computer and executable by the processor, on a computer-readable storage medium such as some form of read-only memory (ROM), random access memory (RAM), CD-ROMs, magnetic tapes, diskettes, and optical data storage devices.

The embodiments described above are illustrative of the present invention. Various modifications may be made to these embodiments without departing from the scope of the invention as defined in the appended claims

The invention claimed is:

1. A method for estimating elastic parameters in a subsoil region, the method comprising:
representing the subsoil region using a grid having columns of cells arranged in an array of horizontal positions, wherein cells of a column are delineated by geological layering of the subsoil region
obtaining a seismic trace associated with said horizontal positions;
performing a seismic inversion for each of a plurality of said columns of cells,
wherein the seismic inversion for a column of cells at a horizontal position of the array comprises selecting a set of elastic parameter values that minimizes a cost function regardless of statistical distribution of the elastic parameter values, wherein the set of elastic parameter values is selected among a plurality of candidate sets of elastic parameter values each having values of elastic parameters for the cells of the column, wherein the cost function has a component given by a difference between the seismic trace associated with said horizontal position of the array and a synthetic trace resulting from a candidate set of elastic parameter values of said plurality of candidate sets of elastic parameter values.

2. The method of claim 1, wherein the seismic inversion is carried out by running a global minimization algorithm.

3. The method of claim 2, wherein the global minimization algorithm comprises a covariance matrix adaptation—evolution strategy (CMA-ES) algorithm.

4. The method of claim 3, comprising:
selecting an uncertainty value for a group of candidate sets of elastic parameter values, wherein the group comprises a number of candidate sets of elastic parameters equal to, or greater than, $4+E[3*\ln(n)]$, E being a floor function, ln a natural logarithm function and n a total number of elastic parameters in a column.

5. The method of claims 3, comprising:
selecting an uncertainty value for a group of candidate sets of elastic parameter values, wherein the group comprises between ten and fifty candidate sets of elastic parameters.

6. The method of claim 1, further comprising:
selecting each column of cells randomly;
selecting the set of elastic parameter values by taking into account any available set of
elastic parameter values for other cells of the grid.

7. The method of claim 2, further comprising:
selecting an initial position of the array;
determining a boundary consisting of horizontal positions of the array which are adjacent to the initial position;
implementing the global minimization algorithm for at least one position of the boundary;
calculating a value of the cost function for each of said at least one position of the boundary;
selecting a propagation position in the boundary, a value of the cost function at said propagation position having a smallest value, then removing the selected propagation position from the boundary;
updating the boundary by adding positions of the array which are adjacent to the propagation position.

8. The method of claim 1, wherein the elastic parameters comprise acoustic impedances and Poisson ratios.

9. The method of claim 1, wherein the geological layering of the subsoil region comprises both permeable layers and non-permeable layers.

10. The method of claim 1, wherein the geological layering of the subsoil region defines more than one hundred layers in the subsoil region.

11. The method of claim 10, wherein each layer in the subsoil region corresponds to soil thickness between 0.5 meters and 2 meters.

12. A non-transitory computer readable storage medium having stored thereon a computer program comprising a program instructions, the computer program being loadable into a data-processing unit and adapted to carry out a method for estimating elastic parameters in a subsoil region, wherein the subsoil region is represented using a grid having columns of cells arranged in an array of horizontal positions, wherein the cells of a column are delineated by geological layering of the subsoil region, the instructions comprising, when run in at least one processor unit:
obtaining seismic traces associated with said horizontal positions;
performing seismic inversion for each of a plurality of said columns of cells,
wherein the seismic inversion for a column of cells at a horizontal position of the array comprises selecting a set of elastic parameter values that minimizes a cost function regardless of statistical distribution of the elastic parameter values, wherein the set of elastic parameter values is selected among a plurality of candidate sets of elastic parameter values each having values of elastic parameters for the cells of the column, wherein the cost function has a component given by a difference between the seismic trace associated with said horizontal position of the array and a synthetic trace resulting from a candidate set of elastic parameter values of said plurality of candidate sets of elastic parameter values.

* * * * *